Oct. 24, 1950     A. C. MORRISON     2,526,764
INFLATABLE AND COLLAPSIBLE MAP

Filed April 17, 1946     2 Sheets-Sheet 1

Inventor.
A. C. Morrison.
By Sterling P. Buck,
Attorney.

Oct. 24, 1950  A. C. MORRISON  2,526,764
INFLATABLE AND COLLAPSIBLE MAP
Filed April 17, 1946  2 Sheets—Sheet 2
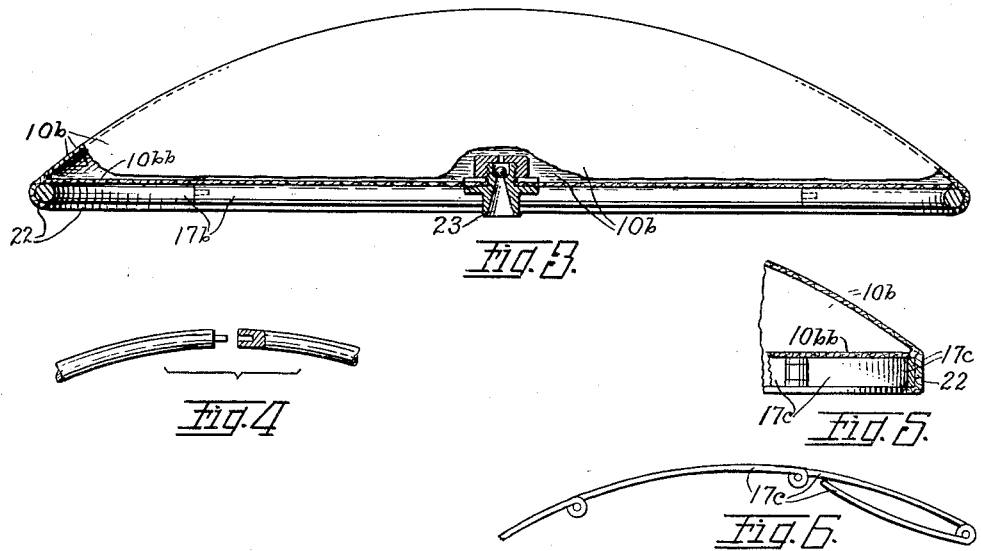
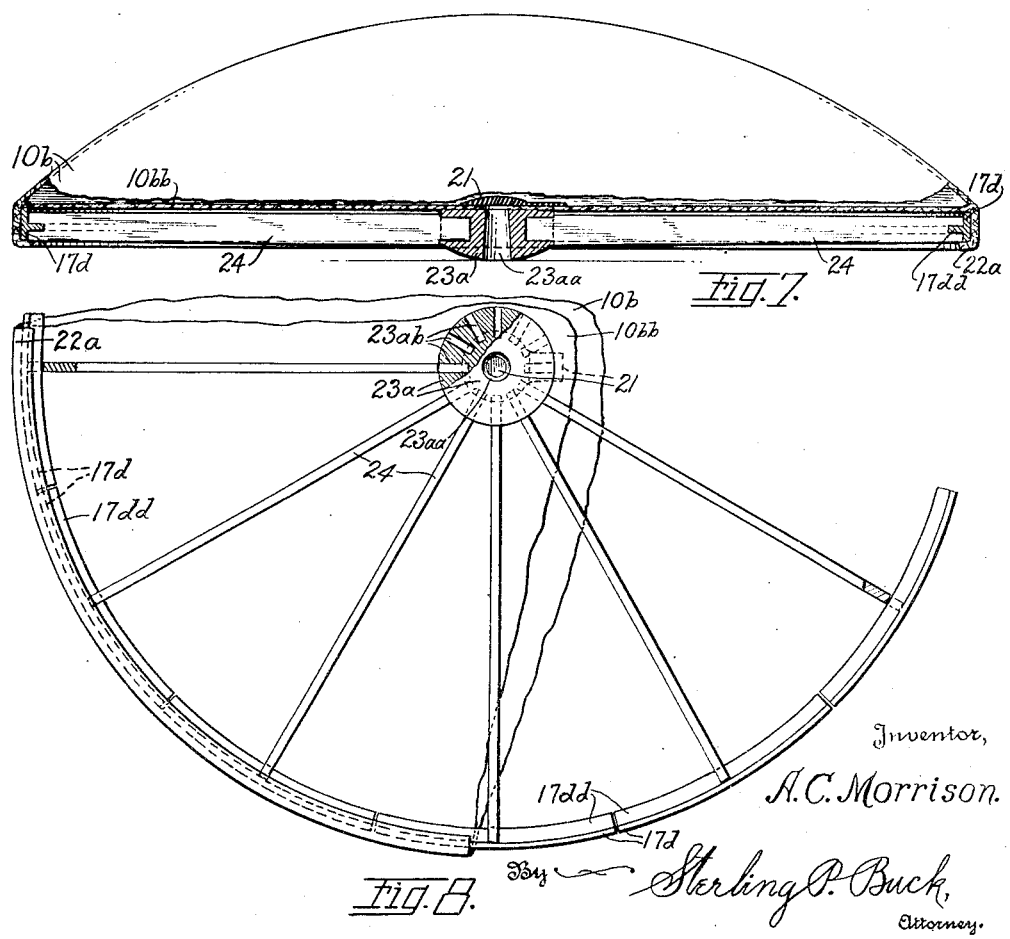
Inventor,
A. C. Morrison.
By Sterling P. Buck,
Attorney.

Patented Oct. 24, 1950

2,526,764

UNITED STATES PATENT OFFICE 2,526,764

INFLATABLE AND COLLAPSIBLE MAP

Archie C. Morrison, Napa, Calif.

Application April 17, 1946, Serial No. 662,864

5 Claims. (Cl. 35—46)

This invention relates to maps, and especially to geographical globes and globe-segments which are inflatable and collapsible; so I choose to apply the name inflatable and collapsible map to this invention.

Recent experiences and developments in naval and aerial navigation have emphasized the advantages and consequent necessity of showing dimensions, shapes and locations of continents, countries, states, cities, towns, mountains, routes of travel, bodies of water, etc. more accurately and understandably than is possible with flat maps or with altitudinal maps; and although globular maps have overcome some of the difficulties of relatively flat maps; there has heretofore existed the disadvantage of transporting large globular maps in the limited spaces afforded by airplanes and other means of transportation.

One object, therefore, of this invention is to provide practical, convenient and accurate means of converting a relatively small package of knockdown or collapsed map and its complemental elements into a relatively large-sized rotatably mounted geographic map of globular shape so as to overcome the above-mentioned disadvantages.

Another object is to provide maps in the form of globe-segments that include, respectively, a collapsible and inflatable portion with collapsible or reducible means to maintain its base-portion in a substantially plane and circular shape and at a predetermined size while its upper portion is inflated and thereby maintained in its normal concavo-convex shape, thereby to provide a large-scale convex map of a relatively small area of the earth's surface, showing the correct relation of geographic places with respect to one another and to the respective degrees of longitude and latitude thereof.

Other objects and important features are pointed out or implied, in connection with the accompanying drawings in which:

Fig. 1 is a side elevation of an inflatable and collapsible globe constructed according to one form of the present invention, parts being broken out at the poles and showing the thickened parts in vertical section at the axial bearings or pivotal centers, this view also showing a collapsible or foldable support on which the globe is mounted for being rotated on its axis, only a few of the many possible geographic indicia being shown on the globe.

Fig. 3 is a view similar to Fig. 2; but showing a modified form of the shape-retaining or shape-maintaining device; parts being broken away and other parts in vertical section.

Fig. 4 is a fragmental sectional view of a part of the annulus or shape-retaining device of Fig. 3.

Fig. 5 is a fragmental sectional view showing a portion of a hinge-jointed annulus seated in a modified form of retaining flange at the margin of the inflatable and collapsible globe-section.

Fig. 6 is a view showing several links or sections of the hinge-jointed annulus above-mentioned.

Fig. 7 is a view similar to Figs. 2 and 3; but showing a modified form of the shape-maintaining means, including a segmental annulus, a hub, and rigid bars normally connecting the annulus and hub, but separately removable therefrom; parts being broken away, and other parts in vertical section.

Fig. 8 is a view partly in bottom-plan and partly in section, to more fully disclose the construction and arrangement in Fig. 7.

Referring to these drawings in detail by use of reference-numerals that correspond to similar parts in the several views and in the following description, the invention is explained as follows:

Figure 1:
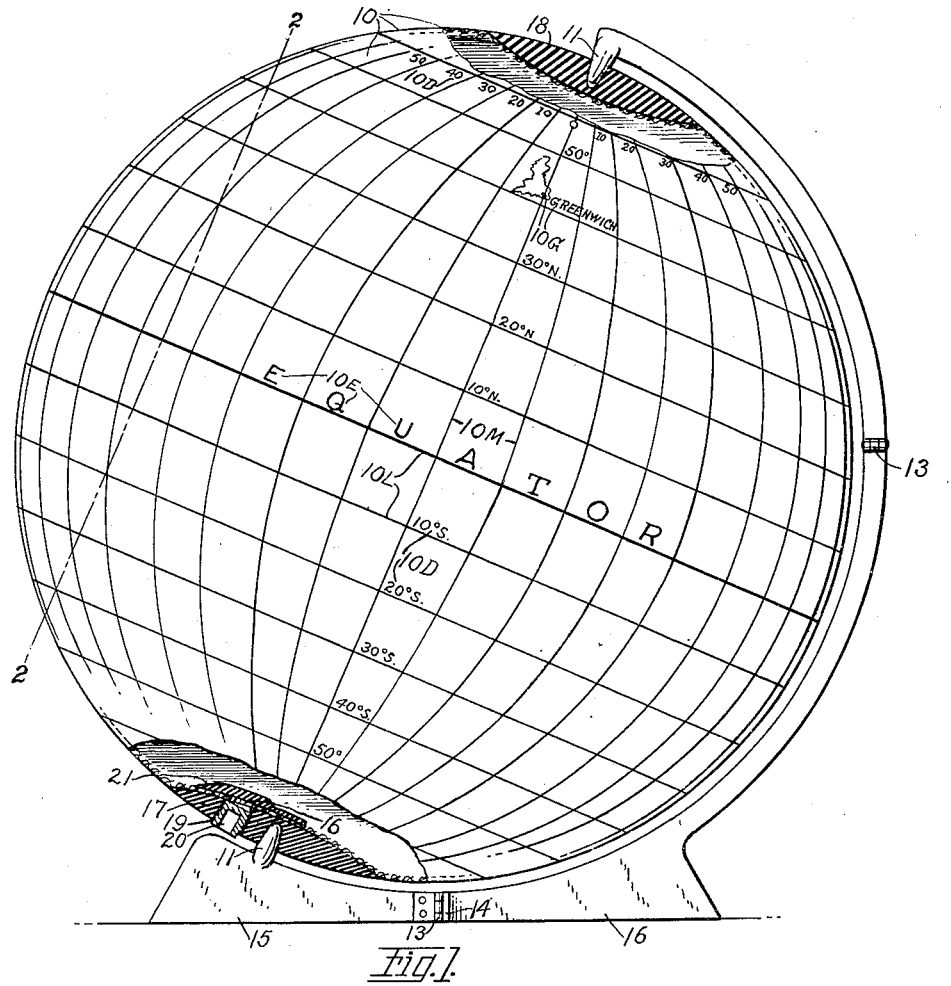

In Fig. 1, the inflatable and collapsible globe 10 is of conventional or geometric form, no attempt being made to show depressed polar regions as of the actual earth; but to so form it would be within the scope of this invention, for instance by merely shortening the distance between the pivots 11—11 of the supporting means. This present form of supporting means is hinge-jointed at 12 and 13, and the hinge 13 connects an arm 14 that extends at right angles to the base-portions 15 and 16 and cooperates with these portions and with a similar arm 14 that is hid behind these other base-portions.

The main part of the globe is formed of flexible, substantially non-elastic or unstretchable sheet material which is airproof, for instance, a preformed wall of globular shape or of concavo-convex shape thruout, as seen at 19; and while the material thereof may well be of composition or fabrication of woven cloth formed around a soluble or fusible globe of the proper (or any desirable) size and shape, then permeated and/or coated with rubber or rubber-like material, and the fusible or soluble globe thereafter poured out thru the air-inlet 16, the invention is not limited to this precise material or to the method here given merely as an example of practical material and method.

For convenience in examining this globe or globular map or any one of the segmental or concavo-convex maps, an apertured tab or loop (not shown) may be provided as means to suspend it from any suitable support; but in the case of large maps, and especially globular maps, a pivotal support having its pivots axially alined at an angle to the vertical, to correspond to the earth's ecliptic, about 23½ degrees. If desired to examine the southern hemisphere from above, the inflated globe can be easily depressed at the pivotal connections so as to disengage it from the pivots 11, and then the globe can be inverted and re-engaged with the pivots while the south pole is at the top; or the globe can be left disengaged and placed in any desired position on any desired and appropriate support.

The bearings 17 and 18, for the pivots 11 may well be formed of hard rubber or other relatively thick and stiff material, preferably convex at both inner and outer sides; vulcanized or otherwise secured to the axial or polar portions of the globe; and either or both of these bearings may be provided with an inlet 19 that is normally closed by a screw-plug 20. In lieu of the screw-plug, or in cooperation therewith, a flap-valve 21, or any appropriate form of valve, may be provided to maintain air-pressure in the globe while it is being used. By pressing the valve 21 inward with a finger or other means inserted thru the air-inlet openings, the air can be caused to escape and permit the globe to collapse or be caused to collapse so it can then be folded into a small fraction of its inflated size. The hinges 13 and 14 permit the globe-support also to be folded into relatively small space.

Figure 2:
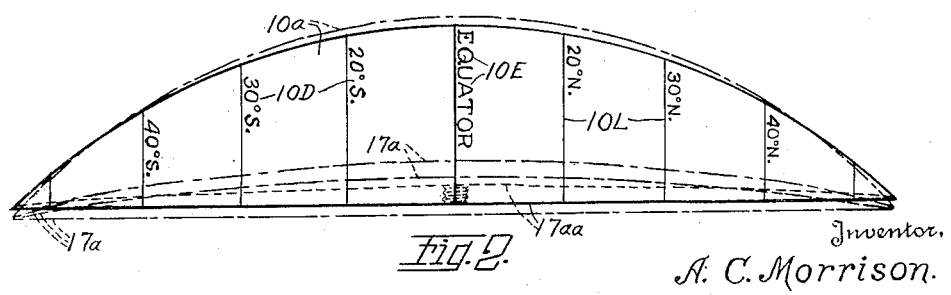
Fig. 2 is a view of one form of inflatable and collapsible globe-segment, such as if the hollow globe were cut in the plane of line 2—2 of Fig. 1, then united with a relatively thick disc or shape retaining device, as presently explained, and disposed with the convex side upward.

In the segmental forms of the invention, the inflatable and collapsible walls may be of the same material and have the same essential properties and qualifications as those described for Fig. 1; and in Fig. 2, the marginal edge of the wall 10a is shown as being united with the marginal edge of a shape-retainer or relatively rigid but somewhat bendable disc in airtight relation; viz., the disc whose shape and position are shown in dot-dash lines at 17a when the segment is merely inflated at very slight pressure; but whose position and shape, when pressure is sufficiently increased, is seen at the doted line and heavy lower line at 17aa; for, as the pressure bends this disc downward to the position at 17aa at its central part, its margin slightly expands so as to cause slight expansion of the margin of the wall 10a, thereby moving the margins of the elements 10a and 17a from their dot-dash-line positions, above and below the full-lines that show the shape and position of the device when merely inflated at low pressure. An air-inlet is indicated at 19a, in dotted lines. No valve is here indicated, and none is essential, for the pressure may be maintained by a valved air-pump (not shown) by which the air is injected and retained.

In Figs. 3 and 4, the shape-maintaining means are shown at 17b, viz., a ring or annulus of arcuate round rod-sections having dowels and dowel-sockets in their ends; this showing one means of collapsing the annulus, by pulling the dowels from their respective sockets, so the stiffening or shape-retaining means can be collapsed for small storage space with the collapsible wall 10b and its complemental base-wall 10bb. The marginal edges of these walls are united airtightly with one another, and also united with a retaining annulus 22 whose inner side is concave so as to fit around the stiffening or shape-retaining annulus 17b. The retaining annulus is only slightly elastic, so the annulus 17b can be forced thereinto, similar to the parts of a well known snap-fastener, or to a pneumatic tire being pressed or hammered into its retaining rim; and when in its normal position in the retaining annulus, the stiffening annulus and the valved inlet-member 23 combine to prevent undue distortion of the base-wall 10bb from its approximately plane condition shown in Fig. 3.

Any appropriate entities of geographic indicia may be printed or otherwise disposed on any form of this invention, including those shown at 10D, 10E, 10G, 10L and 10M of Figures 1 and 2; so it is deemed unnecessary to illustrate more indicia than is shown in the drawings.

In Fig. 5, the parts 10b and 10bb are the same as those of Fig. 3; but the retaining annulus 22a is somewhat different from the part 22 of Fig. 3, and the same is true of Figs. 7 and 8; these parts 22a being of proper form to fit snugly around shape-maintaining anuluses 17c (of Figs. 5 and 6) and 17d (of Figs. 7 and 8). However, the annulus 17c comprises hinge-connected sections that can be folded upon one another for collapsing the annulus into small space; whereas, the shape-maintaining annulus 17d is composed of disunited sections each provided with an inner rib 17dd.

A hub 23a (Figs. 7 and 8) is provided with a valved inlet 23aa, the valve 21 being same as described for Fig. 1; and the hub 23a also contains any appropriate number of spoke-sockets 23ab in which are normally fitted the inner ends of rigid bars or spokes 24 whose outer ends are bifurcated to straddle and firmly grip the respective flanges 17dd. With this form of inflatable segment and its shape maintaining means, there is a minimum of distortion of the base-portion 10bb, for it is supported at the rim or margin, at the center and at the bars 24. Inasmuch as a high degree of pressure is not required within any of these inflatable maps, it is unnecessary to screw-thread the air-inlet and outlet openings; but in lieu of internal threads, the inner surface of the respective inlets may well be inwardly converging, so that a correspondingly shaped pump-nozzle may be wedge-fitted therein when desirable to inject air therethru. This form can be quickly and easily assembled, and as quickly and easily knocked down and packed into a space that is commensurate with the length of each spoke and considerably narrower than such length. In this connection, it should be understood that the thicknesses and other dimensions in these drawings are necessarily exaggerated with respect to those employed in actual practice.

I have no intention to limit my patent-protection to the precise details of construction, materials, or arrangement here illustrated or described in the foregoing; for the invention is susceptible of numerous forms in addition to those here shown and described.

My invention is claimed as follows:

1. A hollow unit that includes flexible substantially airproof sheet material having geographic indicia thereon, this hollow unit being inflatable and collapsible and provided with an air-inlet for admitting air to be introduced for inflating it, said airproof sheet material being a pre-formed globe-segment, and a relatively thick and slightly bendable disc having therethru said air-inlet and having its periphery united with the periphery of said globe-segment in air-tight relation so as to be cooperative with said air-inlet to effect inflation of said globe-segment and to form an approximately plane base for said globe-segment.

2. A hollow unit that includes flexible substantially airtight sheet-material having geographic indicia thereon and is provided with an air-inlet thru which it can be inflated, said unit being preformed to include a concavo-convex portion and a normally substantially plane base-portion, in combination with substantially rigid annular means normally engaged with the peripheral portion of said hollow unit in a proper relation to maintain said base-portion substantially in its normal shape and size while the concavo-convex portion is held in its preformed shape by inflation of the hollow unit.

3. A hollow unit that includes flexible substantially airtight sheet-material having geographic indicia thereon and is provided with an air-inlet thru which air can be introduced for inflating it, said unit comprising a concavo-convex globe-segment and a substantially plane circular base-portion having their peripheries united in airtight relation, and a collapsible annulus united with said peripheries and adapted to engage with annular means to maintain said peripheries and base-portion substantially in their normal shapes while the globe-segment is held in its normal shape by inflation of said hollow unit.

4. A hollow unit that includes flexible substantially airtight sheet-material having geographic indicia thereon and is provided with an air-inlet thru which air can be introduced for inflating it, said unit comprising a collapsible concavo-convex globe-segment and a substantially plane circular base-portion having their peripheries united in airtight relation, a collapsible annulus having its periphery united with the periphery of said base-portion, and substantially rigid means normally engaged with said collapsible annulus and being removable from the latter to enable the hollow unit and annulus to be collapsed and folded into relatively small space.

5. A hollow unit that includes flexible substantially airtight sheet-material having geographic indicia thereon and is provided with an air-inlet thru which air can be introduced for inflating it, said unit comprising a collapsible concavo-convex globe-segment and a substantially plane circular collapsible base-portion having their peripheries united in airtight relation, in combination with a collapsible annulus having its periphery united with the periphery of said base-portion, and substantially rigid means normally engaged with said annulus in a proper relation to maintain said base portion in its substantially normal shape while the hollow unit is deflated, said rigid means comprising substantially rigid elements that are movable with relation to one-another and disengageable from said annulus for enabling the hollow unit and the said annulus and the said rigid means to be collapsed so as to occupy considerably less storage-space.

ARCHIE C. MORRISON.

REFERENCES CITED

The following references are of record in the file of this patent:

UNITED STATES PATENTS

| Number | Name | Date |
|---|---|---|
| 245,757 | West | Aug. 16, 1881 |
| 952,119 | Van Keuren | Mar. 15, 1910 |
| 1,071,358 | Matthews | Aug. 26, 1913 |
| 1,739,861 | Roberts | Dec. 17, 1929 |
| 1,798,644 | Wheat et al. | Mar. 31, 1931 |
| 1,926,787 | Ohno | Sept. 12, 1933 |